Sept. 16, 1969  R. A. MULLER  3,467,914
GAS LASER OR MASER PUMPED BY MONO-ENERGETIC ELECTRONS
Filed April 23, 1964
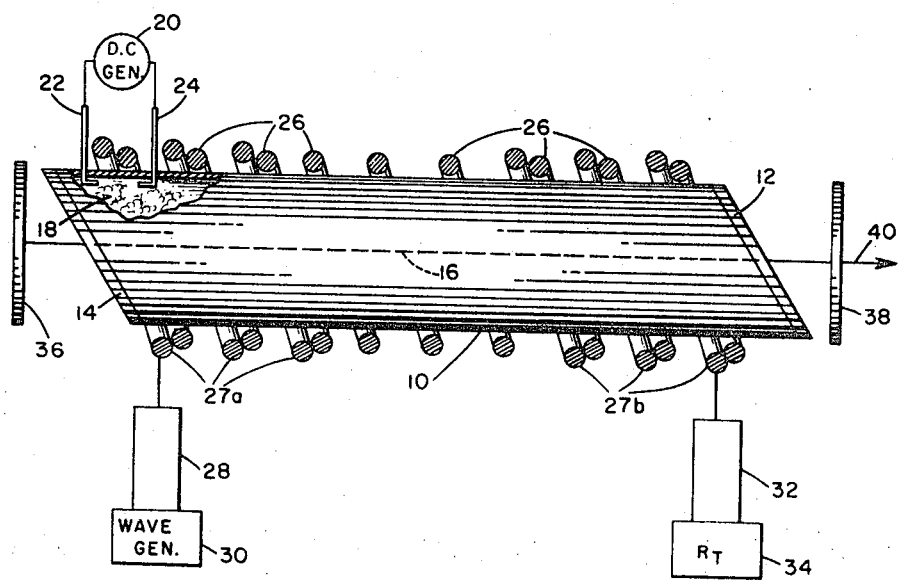
INVENTOR.
RUDOLF A. MÜLLER
BY
ATTORNEY

United States Patent Office 3,467,914
Patented Sept. 16, 1969

3,467,914
GAS LASER OR MASER PUMPED BY MONO-ENERGETIC ELECTRONS
Rudolf A. Muller, Strasslach, near Munich, Germany, assignor to Siemens Aktiengesellschaft, a corporation of Germany
Filed Apr. 23, 1964, Ser. No. 362,053
Claims priority, application Germany, Apr. 30, 1963, S 85,005
Int. Cl. H01s 3/22, 3/09
U.S. Cl. 331—94.5                                   7 Claims

ABSTRACT OF THE DISCLOSURE

A gas laser tube, containing active gas, in combination with a delay-line parallel to said tube, means for energizing said delay-line to provide a traveling electromagnetic wave accelerating free electrons axially in the tube to the wave propagation velocity, for laser active neon on the order of 0.01 the vacuum speed of light, to provide a free electron kinetic energy equal to the quantum energy necessary for population inversion in the laser active gas; a mean life time between successive gas particle-electron collisions of an electron, sufficient for it to regain such velocity, being established by the wave electrical field amplitude and neon pressure, feasibly 0.01 to 1 mm. Hg. Optionally, 10% admixed argon provides a further free electron source by ionization.

---

The present invention relates generally to an apparatus for amplifying electromagnetic radiation and more particularly to a gas maser or laser device having an improved excitation mechanism.

The invention can be employed with equal facility in masers as well as in lasers. However, for ease and simplicity of description reference is generally made to lasers only.

The science of amplification of coherent microwave or optical radiation in accordance with the maser or laser principle, respectively, is well known although of relatively recent origin. Briefly, amplification arises by stimulated emission of radiation established by inducing electronic transition in a laser active material from certain higher to certain lower levels of energy. This may be accomplished in a number of ways, for instance by irradiating the material with radiation of the wavelength to be emitted, or by self-excitation using a resonant cavity, the main and essential requirement being that more radiation be produced by stimulated emission than is absorbed from the incoming radiation which is to be amplified. This condition can be achieved only if the levels between which the transition takes place are sufficiently inverted in population.

More particularly, as applied to a 3-level laser, amplification can only be established when more than 50% of the laser active atoms or molecules are excited to the higher of the two energy levels specifically involved in the laser transition. It will be readily appreciated that it is difficult to achieve an inversion greater than 50%, since a considerable amount of energy is generally necessary to depopulate the normally fully occupied ground-state to the desired degree.

In a 4-level laser the conditions for obtaining a high degree of inversion are more readily achieved. In such devices, the terminal level of the laser transition is not the ground state of the laser active atoms or molecules. If one uses as the terminal level a level which is somewhat higher than the ground state, then the number of electrons in the terminal level is smaller than the number of electrons in the ground state, but nevertheless still greater than the number of electrons in any higher level. Therefore, the terminal level has normally a low occupation. Nevertheless, in thermal equilibrium its occupation number is always higher than that of the initial state or states of the laser active transition.

In a 4-level laser active material population inversion can be readily achieved by selective excitation. The term "selective excitation" is used herein to describe an excitation mechanism, or method, by which exclusively, or at least predominantly, the laser active material is excited to the higher levels rather than to the lower levels of the laser transition.

A method for selective excitation has already been proposed for a two-component gas-laser, such as helium-neon and neon hydrogen systems. In a laser of this type, the neon atoms are excited to metastable levels by an electrical discharge through the gas. The excitation energy of the metastable state of a neon atom transferred to hydrogen molecule by collision is just enough to dissociate the hydrogen molecule into two separated atoms of which one is in an excited state with the principal quantum number $n=3$. The necessary inversion of population is thereby obtained.

However, these systems were arrived at only with considerable difficulty and at the expense of exhaustive research. The problem resides in the difficulty of finding a second gas component which has the proper characteristics for causing selective excitation. Normally, the second gas component is compatible only to a limited degree. Thus, whenever the necessity arises to change the laser active gas, for instance for producing radiation of a different frequency, very extensive research is again required to find a proper second component. It is obvious to those skilled in the art, that both gases must have certain predetermined characteristics in order to produce the desired result, all of which must be found empirically.

It is also known that in collisions between free electrons and gas atoms or molecules, the electrons usually transfer their full kinetic energy to the gas atoms or molecules if energy resonance exists. In such a case only one special energy state of the laser-active gas is excited. Energy resonance means that the energy of the colliding particle exactly equals one of the possible energy differences in the energy level diagram of the target atom. However, heretofore the difficulty has been in producing free electrons having a well defined energy of the proper value to achieve resonance.

It is therefore the primary object of this invention to simplify the means of selective excitation in a laser or maser device.

It is a further object of this invention to provide a gas maser or laser in which the free electrons can be continuously energized and maintained at a predetermined value.

It is a further object of this invention to provide a gas maser or laser which can be selectively excited without the need of a second gas component.

It is still a further object of this invention to provide a gas maser or laser which is operative with a wide variety of gaseous materials and has output capabilities, such as a broad frequency range, which heretofore was not attainable.

An aspect of the present invention resides in the provision of an apparatus for amplifying electromagnetic wave energy by stimulated emission. This includes some means for suitably containing a gaseous material characterized by a plurality of energy levels with transitions between those levels lying in a predetermined frequency range and excitable by electron collision, a source for providing free electrons and discharging them in operative proximity to the laser active gas, and a wave guide system for establishing a traveling wave which is effective to cause the free electrons to establish population inversion between levels of the gas by electronic collision. This wave guide system includes a delay line to control the velocity of the wave and hence that of the free electrons which are coupled to the wave.

For a better understanding of the present invention, together with other and further objects thereof, reference is had to the following description taken in connection with the accompanying drawing, and its scope will be pointed out in the appended claims.

In the drawing the single figure is an elevational view of the laser device shown partly in longitudinal section with associated electrical parts illustrated schematically.

The present invention will be better understood, when it is considered that in order to achieve selective excitation, the electrons which collide with the laser active gas atoms or molecules must have a well defined kinetic energy, $$\frac{m}{2}v^2$$

wherein $m$ is the mass and $v$ the velocity of the electron. This energy has to equal the energy necessary to excite the gas atom or molecule from its ground state into the initial or higher state of the laser transition. In certain cases it may be desirable to selectively excite from some higher state rather than from the ground state. Also, the excitation may lead to some level lying above the initial state of the laser transition and the atom or molecule then undergoes a spontaneous transition from this level to the initial state. In either event, the energy of the colliding electrons must always suitably correspond to the energy required to excite gas atoms to a given level.

The free electrons used for collision with the atom or molecules of the gas must, therefore, have a predetermined and well defined velocity or energy. In the present invention, a wave guide enables an electromagnetic wave to travel along the laser tube. The free electrons inside the tube, generated by means hereafter described, are accelerated by the traveling wave to the propagation velocity. The wave guide is so constructed, by using the principle of a delay line, that the waves traveling along it have a propagation velocity proximating the velocity required to impart to the electrons the necessary kinetic energy for exciting the predetermined level of the laser transition.

In a traveling-wave tube, it is known that parallel to the direction of propagation of the wave there are present regions of high and low electron density. Therefore, most of the electrons in the gas will have a velocity component in the direction of the wave guide equal to that of the traveling wave on the wave guide. The electrons which, by collisions with gas atoms, have lost kinetic energy, thus also velocity, will quickly regain a velocity equal to the velocity of the wave.

In general it is not necessary to consider any other component of the electron velocity than the one in the direction of the wave guide. If the density of the gas be selected so that the mean time between successive collisions of an electron with the gas atoms is longer than the time which the electron needs to regain its original velocity, then most of the electrons in the gas will have an energy $mv^2/2$, where $v$ is the velocity of the wave traveling along the wave guide. The time which is necessary for the electrons to regain their original velocity depends on the electric field strength of the wave. This in effect means that the correct gas density is a function of the intensity of the wave. Investigations have shown that for a pressure range from $\frac{1}{100}$ mm. Hg to 1 mm. Hg a corresponding field strength or wave intensity can be obtained without difficulty.

Referring now to the drawing, the invention is embodied in a gas discharge tube 10 having angularly shaped end portions, and being formed of an electrically insulating material, for instance glass. The tube 10 is sealed at both ends with windows 12 and 14 oriented preferably at the Brewster angle to the beam axis, which is the central axis of the longitudinally extending tube and is referenced by the arrow 16. The windows are constructed to transmit as much of the laser radiation as possible.

The tube contains a laser active gas 18, which is to be excited. A source of free electrons is provided by a high voltage D.C. generator 20 of proper internal resistance and connected to two electrodes 22 and 24 extending into the tube 10 at one end in suitably spaced relation to maintain an electrical discharge. Alternatively, a high frequency discharge source, not shown, may be used.

The free electrons thereby generated within the tube are accelerated by an electromagnetic wave traveling along a conventional wave guide in the form of a delay line composed of a helix 26. The electromagnetic wave is coupled to the wave guide by coil 27a and decoupled by coil 27b. The coil 27a is electrically connected by means of a coaxial cable 28 to a high frequency generator 30. The coil 27b is connected by way of coaxial cable 32 to a terminating resistor 34.

The frequency of the generator 30 and the helical coil or wave guide 26 are tuned to effect only a small decline of the field strength in the radial direction within the wave guide. For instance, at 30 megacycles and with a coil diameter of about 1 cm., the field strength in the axial direction at the coil axis has .7 times the value at the rim of the coil.

Adjacent to each end of the tube, in proper proximity to windows 12 and 14 an angularity to the beam axis 16, are placed mirrors or reflecting planes 36 and 38. The reflecting plane 38 is partially transparent, so that a portion of the radiation traveling between planes 36 and 38 is emitted as coherent laser radiation, see 40.

For purposes of illustrating the invention, let it be assumed that neon is used as the laser active material. In such a case, it is desired to selectively excite the $4S_2$ level of neon, which has an excitation energy of about 19.5 e.v. The free electrons, provided for instance by generator 20, within the gas tube 10 must achieve a velocity of approximately $\frac{1}{100}$ of the velocity of light. This is the velocity of the wave traveling on the described wave guide 26. This has the effect of causing population inversion which in turn results in an amplification of the emitted radiation.

The invention may also be practiced by using a second gas to generate free electrons. Such gas is added in a concentration of about 10%. The gas should have an ionization potential lower than the energy necessary for selective excitation of the laser active atoms or molecules. For neon with an excitaiton energy of 19.5 e.v. argon is a very suitable companion gas. The argon gas is ionized by the field of the wave traveling along the helical coil 26 and thus produces the necessary free electrons. These will be accelerated to an energy of 19.5 e.v. and used for exciting the laser active neon gas.

It will be apparent to those skilled in the art, that the foregoing description of adding a second gas has no connection whatever with the use of a two-component gas mixture for achieving selective excitation as known in the prior art. In a two-component gas laser, it is essential for the two components to have nearly equal excitation energies at certain levels. In the instant invention, the addition of a second gas is merely a convenient way to generate free electrons.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A gas laser apparatus for amplifying electromagnetic wave energy of predetermined frequency by stimulated emission comprising in combination:

an elongated envelope and a laser active gas contained therein characterized by energy levels which provide stimulated emission transitions lying in a predetermined frequency range;

means for generating and providing a flow of free electrons in said gas available for traveling wave acceleration to provide a population inversion among said energy levels;

means including a wave generator and delay line wave guide coupled to said wave generator for establishing a traveling wave propagated through at least a portion of the gas-containing envelope essentially parallel to the direction of elongation of said envelope and thereby effective for controlling the velocity of said free electrons and imparting kinetic energy thereto of a magnitude to excite a predetermined energy level of said gas and cause the free electrons to establish population inversion between said energy levels of said gas by electron energy-transfer collisions;

said gas having a density effective for establishing the mean time between successive collisions of the free electrons with atoms of said gas to be longer than the time required for the electrons to regain the required velocity, through acceleration by said wave, to maintain the population inversion.

2. Apparatus according to claim 1 wherein said means for generating and providing a flow of free electrons includes two spaced electrodes of opposite polarity disposed within and near one end of said envelope.

3. Apparatus according to claim 1, including a second gas within said enevlope having an ionization potential lower than the quantum energy required for population inversion of the first said gas and effective to proviqde free electrons.

4. Apparatus according to claim 1 wherein said wave guide comprises a helix wound around said envelope coaxially of said direction.

5. Apparatus according to claim 1, wherein said second gas comprises about 10% of the total gaseous volume within said envelope.

6. Apparatus according to claim 1 comprising reflective means forming with said envelope a resonant cavity for self-excitation of the emitted radiation.

7. Apparatus for amplifying electromagnetic wave energy of predetermined frequency by stimulated radiative transitions between predetermined energy levels comprising in combination:

an envelope and a laser active gas contained therein having a plurality of energy levels and for emitting stimulated radiation in a predetermined frequency range;

means for generating and providing a flow of free electrons in said gas available for traveling wave acceleration to provide a population inversion among said energy levels;

means including a wave generator and delay line wave guide coupled to said wave generator for establishing a traveling wave of definite wave velocity for propagation through at least a portion of the gas-containing envelope essentially parallel to the desired direction of emission of stimulated radiation for accelerating said electrons to a velocity substantially equal to said wave velocity, the kinetic energy of the accelerated electrons being substantially equal to the energy required to establish said population inversion by energy-transfering, electron-gas molecule collisions;

said gas having a predetermined density effective for establishing the mean time between successive collisions of the free electrons with molecules of said gas to be longer than the time required for the electrons to attain the said definite velocity on the field of said traveling wave.

References Cited

UNITED STATES PATENTS

| 3,233,183 | 2/1966 | Quate | 330—4.6 |
| 3,317,853 | 5/1967 | George | 331—945 |

RONALD L. WIBERT, Primary Examiner